Oct. 2, 1934.   W. S. BAKER   1,975,344
PISTON RING
Filed June 10, 1932
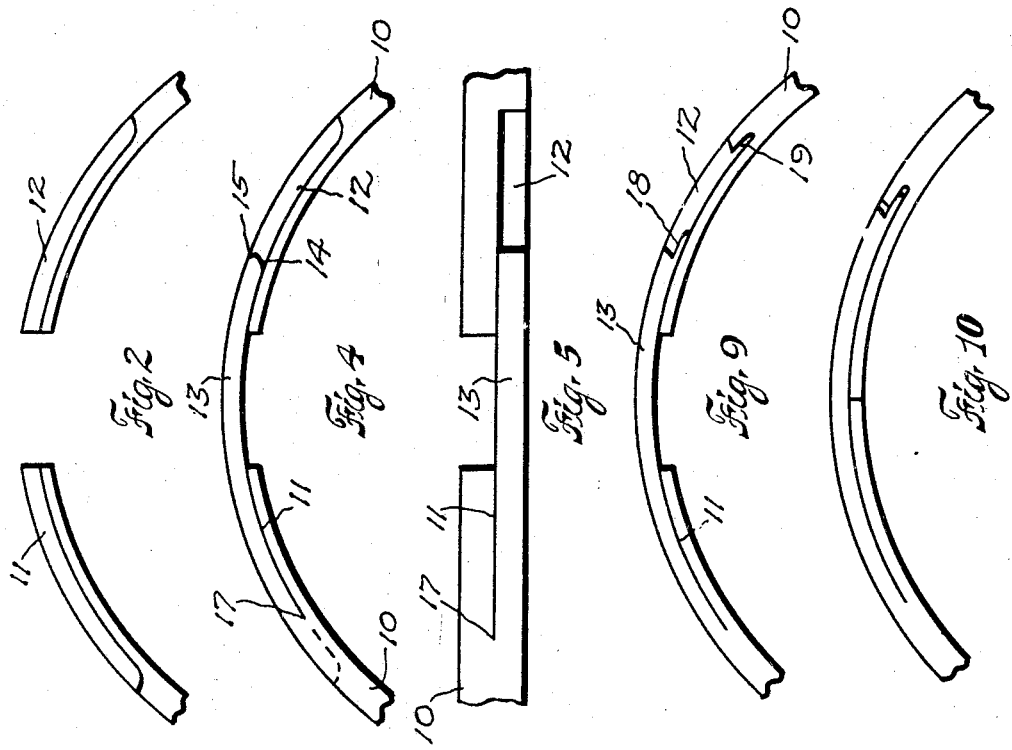
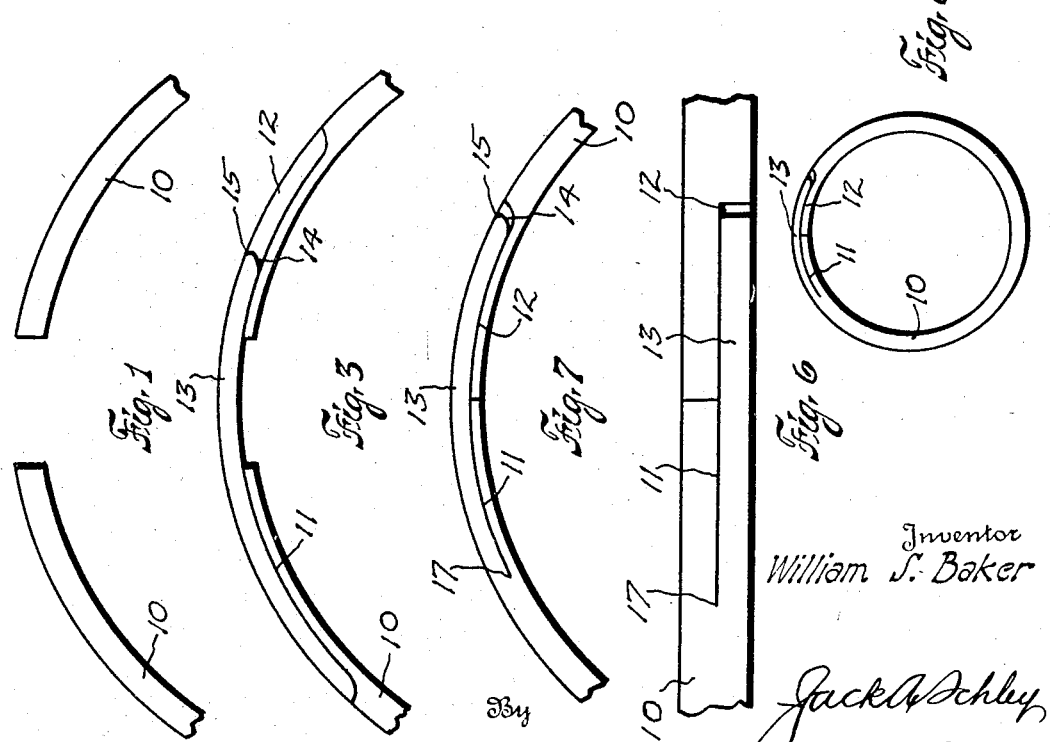
Inventor
William S. Baker
By
Jack A. Schley
Attorney Patented Oct. 2, 1934

1,975,344

UNITED STATES PATENT OFFICE 1,975,344

PISTON RING

William S. Baker, Fort Worth, Tex., assignor of two-fifths to Morgan L. Munday, Fort Worth, Tex., and sixty per cent to Double Seal Ring Company, Fort Worth, Tex., a corporation of Texas Application June 10, 1932, Serial No. 616,377

2 Claims. (Cl. 309—47)

This invention relates to new and useful improvements in piston rings.

One object of the invention is to provide an improved one-piece piston ring of the overlapping gap type.

A particular object of the invention is to embody in a one-piece piston ring all the advantages of a two-part, or two-piece, piston ring such as is shown in my Letters Patent No. 1,750,381, issued March 11, 1930, and at the same time to overcome the disadvantages of such a two-piece ring. In a two-piece ring the cross-sectional area of each member is so necessarily reduced as to weaken the members and make them likely to break through exposure to heat and vibration; also in a two-piece ring there is a lack of initial cylinder wall pressure, the cost of manufacture is high, and considerable loss and difficulty is experienced in handling and installing.

A further object of the invention is to provide a one-piece piston ring wherein the overlapping or tongue element is cut back or separated from the end portion from which it projects, whereby breakage of the tongue is reduced to a minimum, and also whereby expansion of the major portion of the tongue may take place independently of the main body of the ring.

Another object of the invention is to provide a method and means for securing to the body of the ring a tongue or bridging element made from a separate piece of metal, and brazed, welded, or otherwise integrally attached to the ring at a point inwardly of the gap in said ring, whereby said tongue has an unattached portion overlying one end of the ring, and is free to undergo independent movement at this point.

A construction designed to carry out the invention will be hereinafter described together with other features of the invention.

The invention will be more readily understood from a reading of the following specification and by reference to the accompanying drawing in which an example of the invention is shown, and wherein:

Figure 1 is a plan view of the split portion of a piston ring blank,

Figure 2 is a similar view showing the ends of the ring formed with grooves for the reception of a tongue, Figure 3 is a like view showing the tongue in place, prior to securing it to the ring, Figure 4 is a similar view showing the tongue secured in place, Figure 5 is an elevation of the split portion of the ring showing it in its spread position, Figure 6 is an elevation of the same portion showing the ring closed, Figure 7 is a plan view of the same, Figure 8 is a plan view of a complete ring constructed in accordance with the invention, and in its closed position, and Figures 9 and 10 are partial plan views showing a modified form of ring.

In the drawing, the numeral 10 designates the annulus or body of a one-piece piston ring. In carrying out my invention, I preferably make a split annulus, as is shown in Figure 1, in the usual manner and of material best suited for the purpose. It is not necessary to go into the manufacture of this member as it may vary according to the process adopted. Grooves 11 and 12 are formed in the end portions of the ring so as to extend circumferentially and inwardly from the ends of the gap. These grooves may extend approximately half the axial thickness of the ring, but are preferably cut inwardly to more than half the radial thickness of the annulus.

The grooves may be produced in any suitable manner as by milling, or otherwise cutting out the metal, or in any other suitable and practicable manner. It is desirable to machine the groove 12, but this is not necessary in the groove 11; however, where the grooves are cut by milling tools, no further machining or finishing will be necessary. An arcuate tongue 13 is mounted in the groove 11. This tongue has its inner and outer arcuate surfaces struck on arcs concentric to those of the annulus when the ring is fully compressed or closed. The tongue bridges the gap between the ends of the ring and has its free end disposed in the groove 12. The free end of the tongue may be provided with an undercut nose 14 so as to prevent biting into the back wall of the groove 12. The outer edge of the tongue may be beveled or cut off at 15 to obviate a point, which might injure the cylinder wall.

After the tongue 13 has been placed in the groove 11, as is shown in Figure 3, the inner end or extremity of the tongue is welded, brazed, or otherwise secured, to the annulus as is indicated in dotted lines in Figure 4. This leaves that portion of the tongue extending from the point 17 to the end of the annulus free from and unattached to the annulus, but lying in the groove 11 contiguous to the walls thereof, and flush with the surfaces of said annulus. It is obvious that the length of the tongue governs the extent of its projection, and therefore, the groove 12 and the projecting or extending portion of the tongue may be made of any desired length. The tongue has a sliding engagement in the groove 12 and the ring operates in the usual manner.

It is pointed out that where the tongue is formed in the usual manner, which consists in cutting it from the same piece of metal as that of the annulus, there is bound to be a rupture point at the intersection of the tongue and the end of the annulus. In one-piece rings made in the usual way, crystallization soon sets up and the tongue breaks off from the end of the annulus. In my invention, the tongue is resilient and may move independently of either end of the annulus. It may undergo expansion and contraction independently of the annulus, and may be made from an entirely different metal, if desired. Such a goodly portion of the tongue overlies the walls of the groove 11 without being attached thereto as to permit the tongue to freely move away from and toward the walls of said groove 11, when necessary. Such a structure not only prevents breakage due to crystallization, or rupture, but also reduces breakage due to handling and installing. It will be noted that when the ring is fully compressed or closed, as is shown in Figures 6 and 7, the free end of the tongue does not engage the inner end of the groove 12. This permits the tongue to elongate when heated without buckling. The increased length of the tongue, reference being made to the portion lying between the free end of the tongue and the point 17, will give an ample opportunity for dissipation of the heat and will permit the tongue to undergo expansion and contraction in a more uniform manner.

In Figures 9 and 10, I have shown a modified form in which the end of the tongue 13 is provided with a finger 18 adapted to enter a socket 19 at the end of the groove 12. This forms a lock for the extremity of the tongue and prevents outward displacement thereof, which might have a tendency to score the cylinder wall. The shape of the tongue and socket is unessential.

The finger and socket structure has the additional function of preventing spreading of the tongue outwardly due to fluid pressure exerted between the tongue and the bottom of the groove 12. In two-cycle engines which have ports in the side walls, it is desirable to use the tongue and socket form so that any chance of the tongue springing into one of the ports is eliminated.

The description which has been given, recites more or less detail of a particular embodiment of the invention, which is set forth as new and useful, however, I desire it understood that the invention is not limited to such exact details of construction, because it is manifest that changes and modifications may be made, within the scope of the appended claims, without departing from the spirit of the invention.

Having illustrated and described preferred forms of the invention, what I claim, is:

1. A piston ring comprising, a split resilient annulus having a groove in its outer face extending inwardly from one of its split ends, and a separate tongue permanently fastened at one end surface only to the opposite end of said annulus, a portion of said tongue lying along the surface of the annulus and in intimate contact therewith but unattached thereto, so as to expand longitudinally independently of said annulus and at the same time to dissipate heat by such intimate contact, a substantial portion of the tongue bridging the gap of the split annulus and having unlimited circumferential movement in the groove of said annulus, the groove of the annulus being of such length as to permit elongation of the tongue when the ends of the annulus are abutted.

2. A piston ring comprising a resilient split annulus having a pair of grooves in one of its outer corners each of said grooves extending circumferentially from the corners of the ring at said split, and a separate tongue disposed in said grooves and bridging the gap between the ends of said ring, said tongue being permanently secured at one of its end surfaces to one end of said annulus and intimately contacting a radial surface of said pair of grooves, the length of said tongue being less than the combined circumferential length of said pair of grooves, whereby said tongue may freely expand longitudinally on said radial surfaces should the ends of said ring abut.

WILLIAM S. BAKER.